(12) United States Patent
Tirkkonen et al.

(10) Patent No.: US 8,588,084 B2
(45) Date of Patent: Nov. 19, 2013

(54) RESOURCE RESTRICTED ALLOCATION IN LONG-TERM EVOLUTION

(75) Inventors: Olav Tirkkonen, Helsinki (FI); Esa Malkamäki, Espoo (FI); Frank Frederiksen, Klarup (DK)

(73) Assignee: Nokia Corporation, Espoo (FI)

( * ) Notice: Subject to any disclaimer, the term of this patent is extended or adjusted under 35 U.S.C. 154(b) by 1016 days.

(21) Appl. No.: 12/227,809

(22) PCT Filed: Dec. 28, 2007

(86) PCT No.: PCT/IB2007/004137
§ 371 (c)(1),
(2), (4) Date: Mar. 2, 2009

(87) PCT Pub. No.: WO2008/081313
PCT Pub. Date: Jul. 10, 2008

(65) Prior Publication Data
US 2009/0170522 A1    Jul. 2, 2009

Related U.S. Application Data

(60) Provisional application No. 60/877,752, filed on Dec. 28, 2006.

(51) Int. Cl.
*G01R 31/08* (2006.01)
(52) U.S. Cl.
USPC .......................................... 370/252; 370/330
(58) Field of Classification Search
USPC ......................................... 370/329, 252, 330
See application file for complete search history.

(56) References Cited

U.S. PATENT DOCUMENTS

| | | | |
|---|---|---|---|
| 2005/0124344 A1* | 6/2005 | Laroia et al. | 455/436 |
| 2006/0205413 A1* | 9/2006 | Teague | 455/452.1 |
| 2007/0217362 A1 | 9/2007 | Kashima et al. | 370/330 |
| 2008/0049692 A1* | 2/2008 | Bachu et al. | 370/338 |
| 2008/0192847 A1* | 8/2008 | Classon et al. | 375/260 |
| 2009/0028260 A1* | 1/2009 | Xiao et al. | 375/260 |
| 2009/0069023 A1* | 3/2009 | Ahn et al. | 375/260 |

FOREIGN PATENT DOCUMENTS

WO    WO 2008/081313    7/2008

OTHER PUBLICATIONS

3GPP TSG RAN WG1 #45 Shanghai, China May 8-12, 2006.*
Intellectual Property Corporation of Malaysia; Ahmad Hazli Bin Mohd Hisham; "Substantive Examination Adverse Report"; whole document; May 13, 2011; Kuala Lumpur, Malaysia.
TSG-RAN WG1 #44, Denver CO, Feb. 13-17, 2006, R1-060573; "E-UTRA Downlind Control Singaling—Overhead Assessment".
3GPP TSG-RAN WG1 LTE AdHoc; R1-061907, Cannes, France Jun. 27-30, 2006; "DL L1/L2 Control Signaling Channel Encoding Structures".
TSG-RAN WG1 LTE Ad Hoc Meeting; R1-060094; Helsinki, Finland, Jan. 23-25, 2006; "Signaling of E-UTRA Scheduling Information".

(Continued)

*Primary Examiner* — Sai-Ming Chan
(74) *Attorney, Agent, or Firm* — Harrington & Smith (57) ABSTRACT

A method, user equipment, network device, and software product enable allocation of a number of resource blocks over a downlink to the user equipment. The resource blocks are grouped into a number of groups of the blocks, the number of groups being no greater than a maximum number. The resource blocks are arranged in an adjacent manner within each of the groups. The resource blocks are allocated by operating on the groups, and the allocation is signalled using a group allocation indication.

37 Claims, 7 Drawing Sheets

(56) References Cited

OTHER PUBLICATIONS

3GPP TSG-RAN WG1 LTE Ad Hoc, Cannes, France, Jun. 27-30, 2006; "Multiplexing of L1/L2 Control in E-UTRA DL"; R1-061801.
3GPP TSG RAN WG1 #45; R1-061149; Shanghai, China, May 8-12, 2006; "Text Proposal for Downslink OFDMA Resource Allocation and MApping Rules for Distributed Mode Users in E-UTRA, with Discussion on Control Information".

Intel Corporation; "Text Proposal for downlink OFDMA resource allocaation and mapping rules for distributed mode users in E-UTRA, with discussion on control information"; 3GPP TSG RAN WG1 #45, R1-061149; May 8-12, 2006; whole document; Shanghai, China.

J. Shen; "On Inter-cell Interference Mitigation for OFDM Systems"; Telecommunication Science; Jul. 2006; pp. 10-13; Issue 7; Beijing, China (English translation for abstract only).

* cited by examiner

Optimum Resource Allocation (with signaling indexes in joint coding):

| 1 | 1 | 2 | 3 | 3 | 3 | 2 | 2 | 4 | 4 | 2 | 4 | 1 | 1 | 5 | 1 |
|---|---|---|---|---|---|---|---|---|---|---|---|---|---|---|---|

Separate Coding, Signalling to UE1:

| 1 | 1 | 0 | 0 | 0 | 0 | 0 | 0 | 0 | 0 | 0 | 0 | 1 | 1 | 0 | 1 |
|---|---|---|---|---|---|---|---|---|---|---|---|---|---|---|---|

Separate Coding, Signalling to UE2:

| 0 | 0 | 2 | 0 | 0 | 0 | 2 | 2 | 0 | 0 | 2 | 0 | 0 | 0 | 0 | 0 |
|---|---|---|---|---|---|---|---|---|---|---|---|---|---|---|---|

Group Boundary Indication, Bit Mask Dividing PRBs into $N_g = 10$ Groups:

| 0 | 1 | 1 | 0 | 0 | 1 | 0 | 1 | 0 | 1 | 1 | 1 | 0 | 1 | 1 |
|---|---|---|---|---|---|---|---|---|---|---|---|---|---|---|

Group Allocation Signaling, Joint Coding On Top of Grouping by $N_g = 10$ Index Entries:

| 1 | 2 | 3 | 2 | 4 | 2 | 4 | 1 | 5 | 1 |
|---|---|---|---|---|---|---|---|---|---|

Group Allocation Signaling, Separate Coding, signaling to UE1, bit map, length $N_g = 10$:

| 1 | 0 | 0 | 0 | 0 | 0 | 0 | 1 | 0 | 1 |
|---|---|---|---|---|---|---|---|---|---|

Group Allocation Signaling, Separate Coding, signaling to UE2, bit map, length $N_g = 10$:

| 0 | 1 | 0 | 1 | 0 | 1 | 0 | 0 | 0 | 0 |
|---|---|---|---|---|---|---|---|---|---|

FIG. 2

Optimum Unrestricted Resource Allocation:

| 1 | 1 | 2 | 3 | 3 | 3 | 2 | 2 | 4 | 4 | 2 | 4 | 1 | 1 | 5 | 1 |
|---|---|---|---|---|---|---|---|---|---|---|---|---|---|---|---|

Restricted Resource Allocation for Ng=6 groups:

| 1 | 1 | 2 | 3 | 3 | 3 | 2 | 2 | 4 | 4 | 4 | 4 | 1 | 1 | 1 | 1 |
|---|---|---|---|---|---|---|---|---|---|---|---|---|---|---|---|

Group Boundary Indication, Bit Mask Dividing PRBs into Ng=6 Groups:

| 0 | 1 | 1 | 0 | 0 | 1 | 0 | 1 | 0 | 0 | 0 | 1 | 0 | 0 | 0 |
|---|---|---|---|---|---|---|---|---|---|---|---|---|---|---|

Group Allocation Signaling, Joint Coding On Top of Grouping by Ng = 6 Index Entries:

| 1 | 2 | 3 | 2 | 4 | 1 |
|---|---|---|---|---|---|

Group Allocation Signaling, Separate Coding, signaling to UE1, bit map, length Ng = 6:

| 1 | 0 | 0 | 0 | 0 | 1 |
|---|---|---|---|---|---|

Group Allocation Signaling, Separate Coding, signaling to UE2, bit map, length Ng = 6:

| 0 | 1 | 0 | 1 | 0 | 0 |
|---|---|---|---|---|---|

FIG. 3

Resource Allocation for Ng=6 groups:

| 1 | 1 | 2 | 3 | 3 | 3 | 2 | 2 | 4 | 4 | 4 | 4 | 1 | 1 | 1 | 1 |
|---|---|---|---|---|---|---|---|---|---|---|---|---|---|---|---|

Group Boundary Indication, group sizes dividing PRBs into Ng=6 Groups:

| 2 | 1 | 3 | 2 | 4 | 4 |
|---|---|---|---|---|---|

Group Allocation Signaling, Joint Coding On Top of Grouping by Ng = 6 Index Entries:

| 1 | 2 | 3 | 2 | 4 | 1 |
|---|---|---|---|---|---|

Group Allocation Signaling, Separate Coding, signaling to UE1, bit map, length Ng = 6:

| 1 | 0 | 0 | 0 | 0 | 1 |
|---|---|---|---|---|---|

Group Allocation Signaling, Separate Coding, signaling to UE2, bit map, length Ng = 6:

| 0 | 1 | 0 | 1 | 0 | 0 |
|---|---|---|---|---|---|

RESOURCE RESTRICTED ALLOCATION IN LONG-TERM EVOLUTION

CROSS-REFERENCE TO RELATED APPLICATION

Priority is claimed to U.S. Provisional Application 60/877,752 filed 28 Dec. 2006.

FIELD OF THE INVENTION

The invention relates to the field of wireless telecommunications. More particularly, the present invention pertains to control channel structures for cellular systems.

BACKGROUND OF THE INVENTION

The telecommunications industry is in the process of developing a new generation of flexible and affordable communications that includes high-speed access while also supporting broadband services. Many features of the third generation mobile telecommunications system have already been established, but many other features have yet to be perfected.

One of the systems within the third generation of mobile communications is the Universal Mobile Telecommunications System (UMTS) which delivers voice, data, multimedia, and wideband information to stationary as well as mobile customers. UMTS is designed to accommodate increased system capacity and data capability. Efficient use of the electromagnetic spectrum is vital in UMTS. It is known that spectrum efficiency can be attained using frequency division duplex (FDD) or using time division duplex (TDD) schemes. Space division duplex (SDD) is a third duplex transmission method used for wireless telecommunications.

Figure 1:
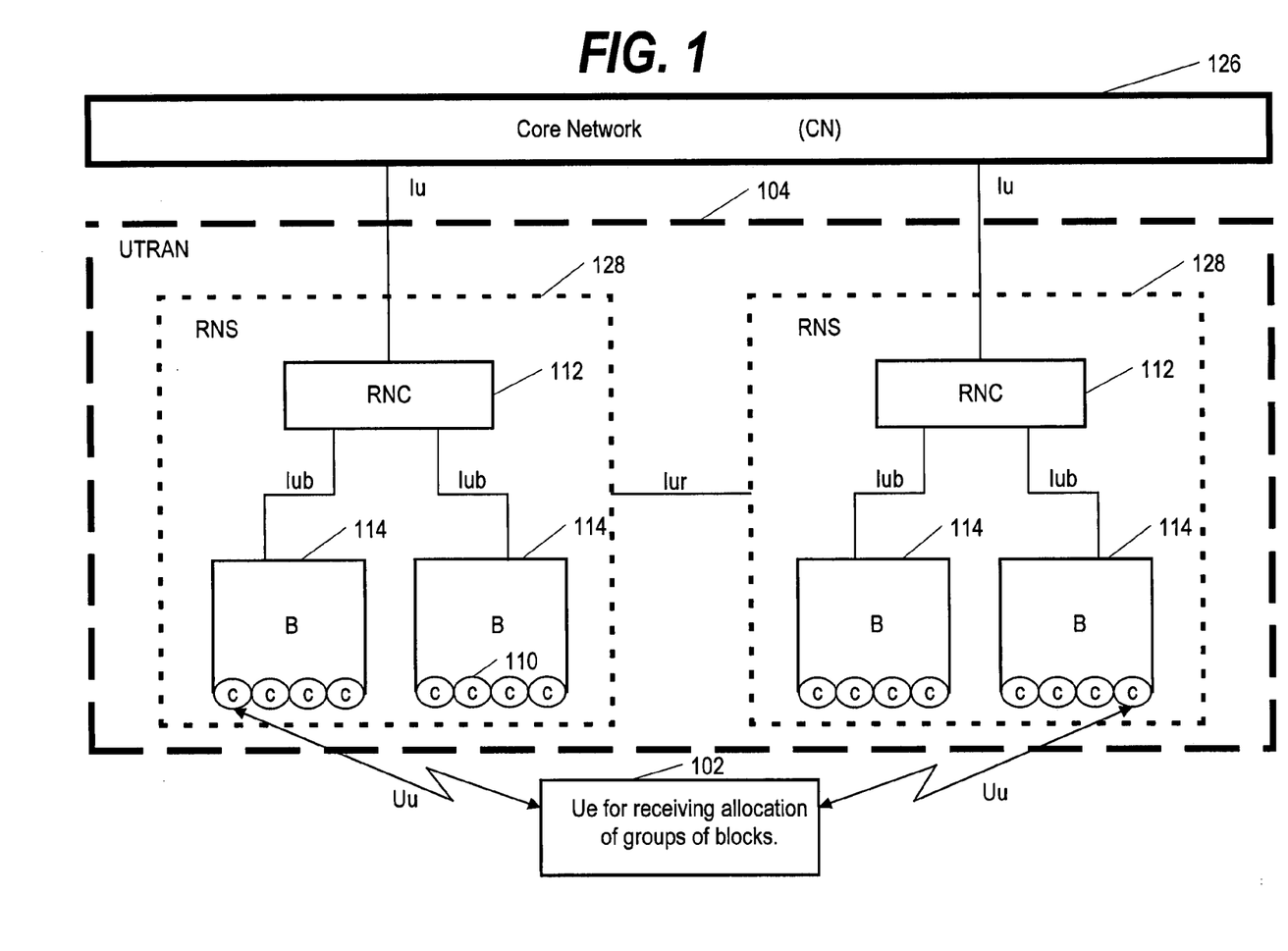
FIG. 1 shows a UTRAN system with a user equipment according to an embodiment of the present invention.
Figure 1A:
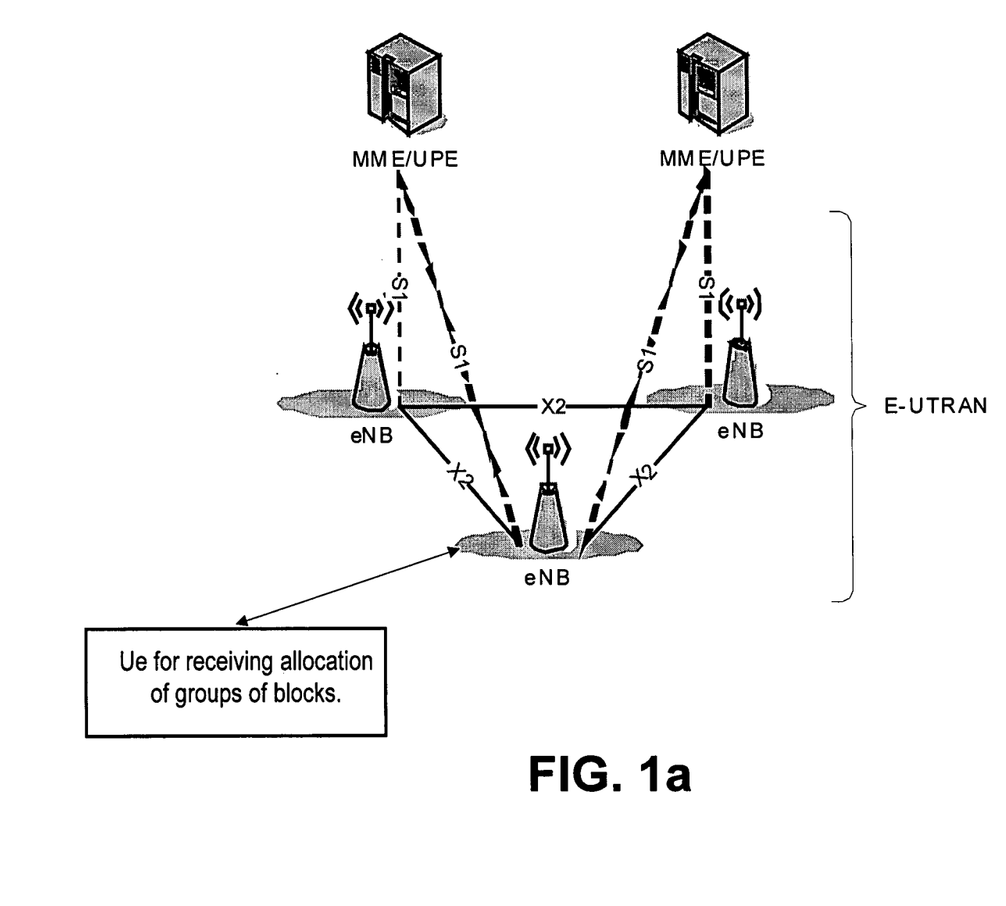
FIG. 1*a* shows an LTE system with a user equipment according to an embodiment of the present invention.

As can be seen in FIG. 1, the UMTS architecture consists of user equipment 102 (UE), the UMTS Terrestrial Radio Access Network 104 (UTRAN), and the Core Network 126 (CN). The air interface between the UTRAN and the UE is called Uu, and the interface between the UTRAN and the Core Network is called Iu.

The UTRAN consists of a set of Radio Network Subsystems 128 (RNS), each of which has geographic coverage of a number of cells 110 (C), as can be seen in FIG. 1. The interface between the subsystems is called Iur.

Each Radio Network Subsystem 128 (RNS) includes a Radio Network Controller 112 (RNC) and at least one Node B 114, each Node B having geographic coverage of at least one cell 110. As can be seen from FIG. 1, the interface between an RNC 112 and a Node B 114 is called Iub, and the Iub is hard-wired rather than being an air interface. For any Node B 114 there is only one RNC 112. A Node B 114 is responsible for radio transmission and reception to and from the UE 102 (Node B antennas can typically be seen atop towers or preferably at less visible locations). The RNC 112 has overall control of the logical resources of each Node B 114 within the RNS 128, and the RNC 112 is also responsible for handover decisions which entail switching a call from one cell to another or between radio channels in the same cell.

LTE, or Long Term Evolution (also known as 3.9G), refers to research and development involving the Third Generation Partnership Project (3GPP) aimed at identifying technologies and capabilities that can improve systems such as the UMTS. LTE, or Long Term Evolution (also known as 3.9G), refers to research and development involving the Third Generation Partnership Project (3GPP) aimed at identifying technologies and capabilities that can improve systems such as the UMTS.

The present invention is related to LTE work that is taking place in 3GPP (see Appendix A).

Generally speaking, a prefix of the letter "E" in upper or lower case signifies LTE. The E-UTRAN consists of eNBs (E-UTRAN or enhanced Node Bs), providing the E-UTRA user plane (RLC/MAC/PHY) and control plane (RRC) protocol terminations towards the UE. The eNBs interface to the access gateway (aGW) via the S1, and are inter-connected via the X2.

An example of the E-UTRAN architecture is illustrated in FIG. 1b. This example of E-UTRAN consists of eNBs, providing the E-UTRA user plane (RLC/MAC/PHY) and control plane (RRC) protocol terminations towards the UE. The eNBs are interconnected with each other by means of the X2 interface. The eNBs are also connected by means of the S1 interface to the EPC (evolved packet core), e.g. to the MME (mobility management entity) and the UPE (user plane entity) which may form the access gateway (aGW). The S1 interface supports a many-to-many relation between MMEs/UPEs and eNBs. The S1 interface supports a functional split between the MME and the UPE.

In this example there exists an X2 interface between the eNBs that need to communicate with each other. For exceptional cases (e.g. inter-PLMN handover), LTE_ACTIVE inter-eNB mobility is supported by means of MME/UPE relocation via the S1 interface.

The eNB may host functions such as radio resource management (radio bearer control, radio admission control, connection mobility control, dynamic allocation of resources to UEs in both uplink and downlink), selection of a mobility management entity (MME) at UE attachment, routing of user plane data towards the user plane entity (UPE), scheduling and transmission of paging messages (originated from the MME), scheduling and transmission of broadcast information (originated from the MME or O&M), and measurement and measurement reporting configuration for mobility and scheduling. The MME/UPE may host functions such as the following: distribution of paging messages to the eNBs, security control, IP header compression and encryption of user data streams; termination of U-plane packets for paging reasons; switching of U-plane for support of UE mobility, idle state mobility control, SAE bearer control, and ciphering and integrity protection of NAS signaling.

A particular aspect of LTE is control channel structure for cellular systems. In such a system, there are multiple resources for which an individual channel quality indicator can be reported. A typical example would be the allocation of frequency domain resources LTE. Let us assume that there are multiple resources that can be allocated to a user, and that the user can provide channel quality indication (CQI) for these multiple resources. A scheduler then has the ability to assign the channels to the users based on this resource-specific CQI.

In LTE, the present working assumption is that a set of 12 subcarriers or 180 kilohertz (kHz) is the bandwidth of a Physical Resource Block (PRB), which is the minimum resource that can be allocated to a user when a localized allocation principle is used, "localized" meaning that full PRBs are allocated to users. In a 10 megahertz (MHz) bandwidth, there would be fifty (50) such PRBs.

It is important to understand that PRBs can be allocated via unrestricted allocation, or via adjacent allocation. The extremes of allocation freedom are as follows. For unrestricted allocation, a user can get any number of disjoint resource blocks; so, user 1 could get, for example, resource blocks 1, 2, 3, 6, 10, 11, 15, 16, 18, and 22. For adjacent allocation, a user can get any number of adjacent resource blocks, but no disjoint sets. So, user 1 could get, for example, consecutive resource blocks 4, 5, 6, 7, 8, 9, 10, and in this case his allocation could be extended with PRB 3 and/or PRB 11, but not, for example, with non-consecutive PRB 44. Unrestricted allocation is the working assumption in LTE downlink (DL), whereas adjacent allocation is the working assumption in LTE uplink (UL). In channels with a high degree of frequency selectivity, it is understood that an unrestricted allocation gives up to 50% higher throughput than an adjacent allocation principle.

In 3GPP radio access network discussions (RAN1), two options for coding of the physical layer (L1) and data link layer (L2) allocation-related control information have been discussed: separate coding and joint coding. According to separate coding, the allocation entries for individual users are separate packets, and the user is not assumed to need to know anything about another user's allocations in order to be able to process his own allocation. In contrast, according to joint coding, all (or at least some) users are coded together, so that the user needs some information about the other users, such as the number of other users jointly coded, and the other user's ordinal number in the set, in order to be able to identify his own allocation. In joint coding, the number of information bits is smaller than in separate coding. In separate coding, however, it is easier to adapt the power usage to the channel condition of the user.

It is preferable to have fixed-length signaling fields. For unrestricted allocation with separate coding, the simplest (and only) fixed-length signaling method is that a bit mask is transmitted for each user so that "0" indicates that the user does not get the resource, whereas "1" indicates that the user gets the resource. For instance, in the LTE 10 MHz option, 50 bits per user equipment (UE) would be needed in order to signal an unrestricted allocation with separate coding.

In joint coding, the simplest signaling method uses a UE index. First there is a (typically implicit) mapping, where each UE is assigned a number. Thus UE1 would have the index 0, UE2 the index 1, and so on. For each of the 50 resources, the index of the UE which gets the allocation is indicated. Various methods to indicate that a resource is not allocated at all have been devised. For example, the index 0 can be used to indicate "no allocation". Alternatively, a separate bit field per resource can be used to indicate that a resource is or is not allocated. To gain more from joint coding, the UE indexes may be reported in a non-binary alphabet. For example, if one out of three alternatives is chosen, then one may use a three-valued object to select the alternative for each PRB.

For further background information related to the invention, incorporated by reference herein in its entirety is the document TSG-RAN WG1 #44, R1-060573 (Feb. 13-17, 2006) titled "*E-UTRA Downlink Control Signaling—Overhead Assessment*", which discusses various aspects of joint versus separate coding. Also incorporated by reference herein in its entirety is the document 3GPP TSG-RAN WG1 LTE Ad Hoc, R1-061907 (Jun. 27-30, 2006) titled "*DL L1/L2 control signaling channel encoding structures*", which discusses various joint coding structures.

The problem addressed by the present invention is to reduce the signaling overhead related to the unrestricted allocation principle, without losing the flexibility and gains as compared to the adjacent allocation principle. This problem is especially relevant in the case of separate coding, where a bit field of 50 bits per UE starts to be in the upper limit of tolerability.

In the past, there have been attempts to solve this problem. For background about those past attempts, incorporated by reference herein in its entirety is the document TSG-RAN WG1 LTE Ad Hoc Meeting, R1-060094 (Jan. 23-25, 2006) titled "*Signaling of E-UTRA Scheduling Information*", which discusses various aspects of joint versus separate coding. In that document, it was proposed for there to be a run length and index for each UE signaled. Run length $R_u$ means that for UE u, only sets of R consecutive resources are allocated. There is no restriction that all such sets should be adjacent. Thus if $R_u$ is one for all users, the method is the same as the "unrestricted method", with the added overhead of signaling $R_u$. For example, the run length for UE 1 is 4, and for UE 2 the run length is 3. The indexes for UE1 and UE2 would be 0 and 1, respectively. In the allocation table, there is a list of UE indexes: 0 0 1 0 1 0 0 0. Each "0" means 4 consecutive resources allocated to UE1, and each "1" means 3 consecutive resources allocated to UE 2. Thus after expanding according to the run length, the resource allocation would be as follows: 0 0 0 0 0 0 0 0 1 1 1 0 0 0 0 1 1 1 0 0 0 0 0 0 0 0 0 0 0 0. So, altogether, 24 resources are allocated to UE1, and 6 resources to UE2.

This type of prior art does not apply to separate coding at all. From a joint coding perspective, it is difficult to implement at the transmitter. If one wants to gain from the restrictions, one needs to solve a constrained optimization problem, where the run length of all users affects the resources available for all other users. A further difficulty with that proposed solution is that the run length of each user also needs to be signaled to all users in order for each UE to know how to decode the allocation table.

Background about a second attempt to solve this problem of reducing signaling overhead can be found in the document 3GPP TSG-RAN WG1 LTE Ad Hoc, R1-061801 (Jun. 27-30, 2006) titled "*Multiplexing of L1/L2 Control in E-UTRA DL*" which is also incorporated herein by reference in its entirety. According to this second attempted solution, one is restricting the possible control signals to a high degree. By allowing only a set of distributed type of allocations, 9 bits are used to signal an allocation in 5 MHz (12 resource blocks). Those 9 bits include 3 bits allocated sub-band map, plus 2 bits starting RB ID in the first sub-band, plus 2 bits ending RB ID in the last sub-band, plus 2 bits spacing of allocated RBs ("spacing" indicates a code in the frequency domain). This second type of prior art allows only very limited gains over "adjacent" allocation. Essentially, this second type of prior art method selects an adjacent set of resources for the users, and then divides the resources in the code domain, so that the user does not take all the resources in his adjacent band. General background about technology related to the present invention can be found in the U.S. Application of Tsuyoshi Kashima and Sigit Jarot, titled "Control Signal Structure for Resource Allocation In E-UTRA" (Ser. No. 11/486,834), which is incorporated herein by reference in its entirety.

SUMMARY OF THE INVENTION

The present invention is directed at reducing signaling needed for freely allocating a set of resources to an LTE downlink (DL) user. In the resource allocation method of the present invention, there is a set of resources that can be characterized using a linear index (PRBF) for which separate CQI measurements may be done. There are a number ($N_{PRBF}$) of such resources. There is a maximum number ($N_g$) which is the maximum number of PRB groups ($N_g \leq N_{PRBF}$), known to the transmitter (e.g. the base station or access point transmitting allocation information) and known to the receiver (the UE). The physical resources allocated in one instance of allocation are dynamically divided into at most the maximum number ($N_g$) of groups. In each part, there are a number of consecutive linear (PRBF) resources. The allocation to the users then operates on the set of the maximum number ($N_g$) of parts.

The allocation of these resources to users is signaled using a group allocation indication. Thus, the UE 102 in FIG. 1 receives an allocation of a group or groups of blocks.

In a separate allocation method, there may be a set of the maximum number ($N_g$) of bits for each user, where the bit mask indicates whether the user gets the part or not. In a joint allocation method, however, there may be a list of the maximum number ($N_g$) of UE indexes, where the index indicates which user gets the corresponding part.

An important aspect of the present invention is to use the number $N_g$, which is the maximum number of PRB groups. The 50 PRBs are dynamically divided into at most $N_g$ groups of consecutive subcarriers. Allocation information operates on these $N_g$ groups. Thus, for each UE, in separate coding, $N_g$ bits are transmitted, instead of 50.

The present invention has several distinct advantages as compared to the first type of prior art discussed above, in which it was proposed for there to be a run length and index for each UE signaled. The signaling of the present invention is applicable to separate encoding, and dramatically reduces the overhead of separate encoding. Also, the restrictions to the scheduler imposed by the presently disclosed method are much simpler than the ones imposed by that prior art method.

The present invention also has several distinct advantages as compared to the second type of prior art discussed above, in which 9 bits were used to signal an allocation in 5 MHz. Comparing with the same overhead, the present disclosed method provides a much wider range of possible divisions of resources. From a single user's perspective, the second type of prior art essentially only selects a continuous bandwidth among a number of alternatives, and performs distributed transmission over this bandwidth. Also, the distribution combinations of the different users are very dependent, and the operation of a scheduler therefore becomes difficult.

According to the present invention, the scheduling operation would not be substantially complicated. A UE-specific metric (e.g. based on buffer status, channel condition) is constructed for each UE and for each PRB. The scheduler optimizes its metric of choice, and gets an unrestricted allocation. The number of groups is then calculated, and some groups are deleted if needed. The deletion of groups can be performed based on the already calculated metrics.

DETAILED DESCRIPTION

An embodiment of the present invention will now be described. This is merely to illustrate one way of implementing the invention, without limiting the scope or coverage of what is described elsewhere in this application.

The maximum number of groups ($N_g$) described above may be signaled on system information, it may be a system specific constant, it may depend implicitly on other system specific constants or parameters signaled in system information such as system bandwidth, or it may be dynamically signaled. During a transmission when $N_g$ is fixed to a value, there may always be exactly $N_g$ parts, or there may be less than $N_g$ parts.

The grouping of the resources to $N_g$ groups may be signaled using any method known in the art. This requires signaling the position of $N_g-1$ group boundaries, which may be situated between any two consecutive PRBs. In other words, there are $N_{PRBf}-1$ possible positions for the group boundaries. Seven alternative methods to signal the group boundaries are as follows.

According to the first, straightforward alternative, the position of each group boundary is separately indicated with a bit field. Thus, employing a ceiling function instead of brackets, $(N_g-1)\lceil \log_2(N_{PRBf}-1)\rceil$ bits are needed.

According to the second alternative, if $\log_2(N_{PRBf}-1)$ is not an integer, instead of binary (i.e. 2:ary) addressing to the positions of group boundaries, $N_{PRBf}-1$:ary addressing may be used, with the transformation to bits taken only after constructing the whole address. In this way, $(N_g-1)\lceil \log_2(N_{PRBf}-1)\rceil$ bits are needed.

According to the third more involved alternative, the fact that that the possibilities for the position of the n:th boundary are different from the possibilities of the (n+1):th boundary is used to reduce the signaling. For example, if there always is $N_g$ groups and $N_g-1$ group boundaries, there are $N_{PRBf}-N_g$ possible positions for each group boundary. Thus $(N_g-1)\lceil \log_2(N_{PRBf}-N_g)\rceil$ bits are used.

According to the fourth alternative, a similar method as compressing the signaling for the first and second alternatives can be used in the third alternative. If $\log_2(N_{PRBf}-N_g)$ is not an integer, instead of binary (i.e. 2:ary) addressing to the positions of group boundaries, $N_{PRBf}-N_g$:ary addressing may be used, with the transformation to bits taken only after constructing the whole address. In this way, $\lceil (N_g-1)\log_2(N_{PRBf}-N_g)\rceil$ bits are needed.

According to the fifth alternative, optimum signaling, joint for all boundaries, is used. For each $N_{PRBF}$ and $N_g$, there is a fixed number of alternatives. Optimum signaling enumerates these alternatives and refers to them with a look-up table. This is not an implementable approach. With this method $$\left\lceil \sum_{k=1}^{N_g} \log_2(N_{PRBf}-k) - \log_2(N_g!) \right\rceil$$

bits are needed

According to the sixth alternative, sub-optimal joint signaling with variable bit number is used. By utilizing the knowledge of the position of the first boundary, the addressing space to the next boundary may be compressed in an implicit manner. This method would likely require, however, an indication of the length of the bit field, and is impractical.

According to the seventh alternative, it is known to divide a set of resources into multiple parts of consecutive resources using a starting indication "1" and continuation indication "0". This means that a bit mask is transmitted where there is one bit for each of the PRBs. If this bit is "1", this means that a new group is beginning. If this is "0", it means that the PRB in question belongs to the same group as the previous PRB. As the first PRB always starts a group, $N_{PRBf}-1$ bits are needed to indicate any $N_g$.

The number of signaling bits in options 4 and 5 with $N_{PRBf}=50$ (corresponding to the 12-subcarrier PRB in the 10 MHz LTE option), can be found in the following table for several values of $N_g$.

| $N_g$ | 8 | 12 | 16 | 20 |
|---|---|---|---|---|
| Alternative 4 (optimal for separate indication of each boundary) | 38 | 58 | 77 | 94 |
| Alternative 5 (optimal signaling) | 29 | 37 | 42 | 45 |
| Alternative 7 (bit mask) | 49 | 49 | 49 | 49 |

For pertinent values of $N_{PRBf}$ and $N_g$, the straightforward Alternative 7 comes very close in efficiency to non-implementable optimum signaling, and is thus considered in the preferred embodiment of the present invention.

The indication of the grouping needs to be signaled to the users. It needs to be decidable with sufficient reliability by all users that have a dynamic allocation in the grouped resources in the transmission time interval (TTI) of interest. Thus, modulation (or coding) of the format and/or the power level should be chosen accordingly. The grouping indication may be signaled together with other control information, or in a separate coding block.

Resources that are not dynamically allocated in the TTI in question may be excluded from the signaling with various methods. Some users may be considered dummy users, but this would reduce the efficiency of the compression; for all active users there would be bits indicating that the resource is not allocated. Another idea is to indicate the groups of resources that are not allocated directly. Thus, there may be more than $N_g$ groups indicated in the first phase, together with, or followed by, an indication of which groups are not allocated. Alternative 7 (bit mask) of signaling the grouping is most flexible for this purpose.

Two variations on this theme may be considered. According to the first variation, the bit mask in Alternative 7 indicates at most $N_u$ groups. There is an additional bit mask with $N_u$ bits, indicating which of the at most $N_u$ groups are to be considered as the at most $N_g$ groups that are allocated. Note that this method has fixed length. In addition to a grouping indication bit mask of Alternative 7 with $N_{PRBf}$ bits, there are exactly $N_u$ bits to indicate whether the constructed at most $N_u$ groups are allocated or not.

According to the second variation, the bit mask of Alternative 7 is extended to a mask of three-valued objects. For each of the $N_{PRBf}-1$ possible boundary placements, there are three possible values: (a) there is a boundary of a group starting, which group is not allocated, (b) there is a boundary of a group starting, which group is allocated, or (c) there is no boundary.

Of these two variations, Variation 2 provides the highest flexibility, and does not require signaling/standardizing a constant $N_u$. The complexity of Variation 2 is not much higher than that of Variation 1. Thus Variation 2 is used in the preferred embodiment of the present invention.

In case the number of groups signaled is less than the agreed maximum $N_g$ (which is possible at least in signaling alternatives 1, 2, 7 above), there are redundant bits in the bit masks signaled to the individual users, indicating which groups they get. In joint signaling, this may be directly exploited, using methods discussed in one of the documents mentioned above: 3GPP TSG-RAN WG1 LTE Ad Hoc, R1-061907 (Jun. 27-30, 2006) titled "*DL L1/L2 control signaling channel encoding structures.*" In separate coding, there may be a repetition coding structure. For example, if $N_g=10$, and group boundary indication indicates only 6 groups, the remaining 4 bits in the user-specific bit mask in group allocation indication may simply be repeated copies of the 4 first bits of the 6-bit sequence.

In addition to localized allocation, where full PRBs are allocated to users, in LTE it is possible to allocate distributed virtual resource blocks (d-VRBs). This means that at least two PRB are divided into at least two d-VRBs, which constitute resources from more than two PRBs. These d-VRBs are then allocated to users. As a result, one d-VRB spans multiple PRBs, and in one PRB, there are parts of multiple d-VRBs. For this, the UE should know, which PRBs are used for distributed transmission.

Distributed allocations are used when there is no frequency selective information about the channel to an UE, or when such information is unreliable. The target of using distributed allocation is to generate frequency diversity. Note that if the UE needs a lot of resources, allocating the user full PRBs, so that the PRBs are scattered over the full transmission bandwidth, already gives significant amounts of frequency diversity. Only for users with low data rate, d-VRBs are necessary.

There are a number of possibilities related to selecting the PRBs that are used for d-VRBs, and how the d-VRBs are constructed from the resources in the selected PRBs. Four of those possibilities will now be briefly described.

A first possibility is for the PRBs used in distributed allocation to be selected with full or limited freedom. With full freedom, any selection of PRBs may be taken as a basis for constructing d-VRBs. With limited freedom, the first PRB may be selected, and/or the number of the PRBs may be selected, and/or the difference of the index of the PRBs used for d-VRBs may be selected. For example, it may be signaled that 5 PRBs starting from PRB 2 are selected for d-VRBs. The difference of the PRBs would be fixed so that the maximum frequency diversity is allowed. With 50 PRBs, that would mean that PRBs 2, 12, 22, 32, 42 would be used for d-VRBs.

A second possibility is for the PRBs used for distributed VRBs may be selected (semi)statically or dynamically. In the former case, the PRBs could be signaled e.g. in system information. In the latter case, signaling on a TTI-to-TTI bases would apply.

A third possibility is for the d-VRBs may be constructed from the resources in the selected PRBs using frequency division (the d-VRBs constitute of a number of subcarriers in each of the selected PRBs), time division (the d-VRBs include all the subcarriers in the selected PRBs for a time that is smaller than the TTI, or a combination of both.

A fourth possibility is for the construction of the d-VRBs from the resources of the selected PRBs may be the same in all cells, or it may be cell-specific. A cell-specific construction may be explicitly signaled in system information, or it may depend implicitly on other signaled information, such as the cell ID. A cell-specific construction may be based either on different selection of resources for d-VRBs, or the same selection of resources, but different addressing order. The latter means that in cases where there would be d-VRBs based on the same parameters (number of PRBs, first PRB, difference of PRB index) in multiple cells, the order of addressing (and thus allocating) these d-VRBs would be permuted in different cells.

Grouping indication according to the present invention may be realized by several alternate methods. Four of those alternate methods will now be briefly described.

The first alternate method is separate distributed/localized indication and group indication. The group indication would proceed as if no PRBs would be selected for distributed transmission. The group indication would be interpreted so that the PRBs used for distributed transmission would be removed from the resources. In this case, there may be some signaling inefficiency, as some bits in the group indication may be meaningless The second alternate method is a grouping indication based on a distributed/localized indication. In this case, the indication of the grouping would take into account the knowledge of which PRBs are distributed. For example, if a bit map would be used for grouping indication, this bit map would be shorter, if PRBs are used for localized transmission.

The third alternate method is a distributed/localized indication based on a grouping indication. In this case, after grouping indication, there would be an indication whether the PRBs in the group are to be considered for distributed or localized transmission.

The fourth alternate method is a joint distributed/localized indication and grouping indication. For example, distributed/localized indication may be combined with the bit mask of grouping indication Alternative 7 above, where non-allocation signaling is taken into account as discussed above. Then the bit mask for group indication would extended to a mask of four-valued objects. In order to distinguish whether a resource is localized or distributed, indication per resource block (not per possible boundary placement) is required. Thus for each of the $N_{PRBf}$ resource blocks, there are four possible values. These may be for example chosen as: (a) the PRB is used for distributed allocation, (b) the PRB is the first in a group, which group is not allocated, (c) the PRB is the first in a localized allocation group, which group is allocated, or (d) the PRB is either used for a localized allocation group, or a non-allocated group, but the PRB is not the first in the group.

Combining resource allocation signaling for distributed allocation with the disclosed grouped localized allocation principle, may be done straightforwardly in a joint coding method. In separate coding, there a few options, three of which will now be briefly described.

According to the first option, apart from the signaling required to distinguish between localized and distributed resources, there may be separate control channels and control channel formats for distributed allocations and grouped localized allocations. For grouped localized UEs, per UE bit masks with one bit per (allocated) group would be signaled. For distributed UEs, the index(es) of the d-VRBs allocated to the UE are signaled. As all distributed resources are similar, it is necessary to signal an index of a first and a last distributed resource to a UE, or an index of a first resource, together with the number of d-VRBs allocated to the user. The control channels for distributed and grouped localized users may have different length. UEs may be divided to distributed and localized categories using higher layer signaling, so that they need not follow both types of control channels. The different types of control channels would be transmitted on different sets of resources, multiplexed by frequency division multiplexing (FDM), time division multiplexing (TDM), code division multiplexing (CDM), or any combination of the three.

According to the second option, the separately coded control channel for a UE may have a bit field which indicates whether the UE gets grouped localized or distributed resources. The interpretation of the remaining bits in the field indicating the allocations depend on this bit field.

According to the third option, the separately coded control channel may be arranged so that one can refer simultaneously to distributed and grouped localized resources.

With a grouping principle based on a given granularity in the frequency domain only (i.e. based on $N_{PRBF}$ frequency domain resources) the minimum packet size may become too large. In that case, it may be beneficial to be able to subdivide frequency domain grouped PRBs into multiple time domain parts. For example, by appending two bits to the bit mask transmitted to each UE, it can be signaled that the UE gets a first or second half of the resources in the groups that are indicated by the bit mask. The resources may be divided into two using TDM, FDM or CDM, or any combination of the three. With four bits, any combination of quarters of the resources in the resources indicated by the bit mask may be signaled. Note that this principle may be used as a (rather inefficient) way of generating distributed allocations. Also, this may be used to decrease the frequency domain granularity. For example, if there are 50 PRBs of 12 subcarriers, the grouping may be performed on set of 2 PRBs, i.e using $N_{PRBf}=25$. Then one may add two or four bits to the UE-specific bit mask, so that individual PRBs and possibly their halves can be allocated.

Other information that may be transmitted on the control channel, be it UE identities, data-associated non-allocation information (e.g. HARQ-info, Transport Format, modulation, MIMO configuration) or non-data associated information (e.g. UL ACK/NACK, PICH, RACH response indication, system info change indication) may be transmitted using any method known in the art. In particular, non-allocation data-associated information may be transmitted separately or together with the allocation information discussed here. Various types of cyclic redundancy checks (CRCs), UE maskings, and the like may be used. Possible separate UE entries and/or nested entries of multiple UEs may be transmitted in TDM/FDM using known or pre-assigned resources, or using blind detection.

Figure 2:
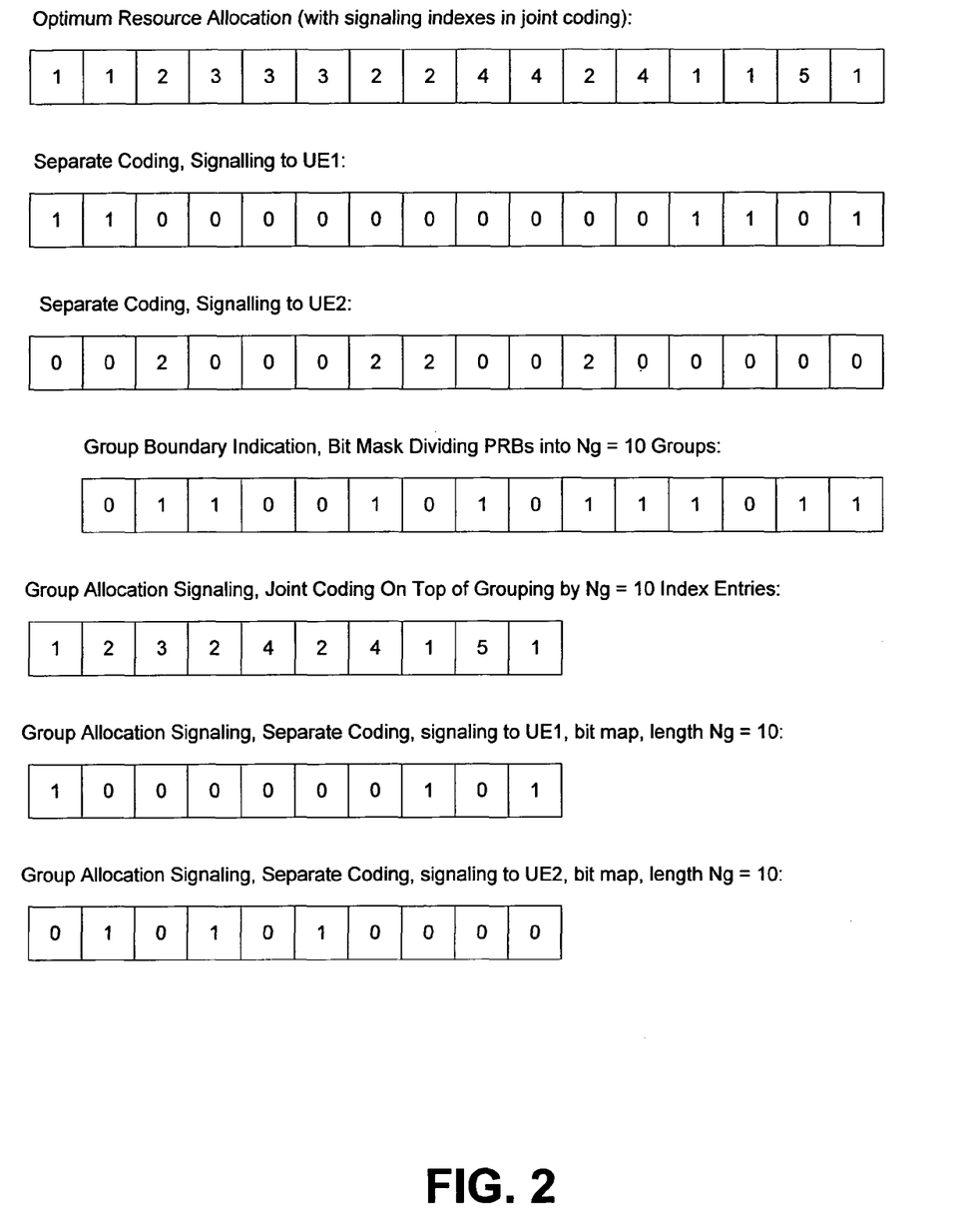
FIG. 2 shows an example of an allocation, and signaling with and without grouping.

An example of the present invention is shown in FIG. 2, with $N_{PRBf}=16$. An example of an unrestricted allocation of these 16 resources to 5 users is first portrayed. In joint coding, the UE index map would be directly signaled. In separate coding, the bit masks for users 1 and 2 are exemplified. Next, there is a group boundary indication bit mask, according to this invention. This bit mask divides the 16 PRBs into $N_g=10$ groups. Note that only 15 bits are needed for this. In this particular example, 10 groups would be sufficient to indicate the unrestricted allocation. The group allocation signaling is depicted for joint coding (10 UE index entries), as well as for separate coding, where the 10-bit masks of UE 1 and UE 2 are depicted.

Figure 3:
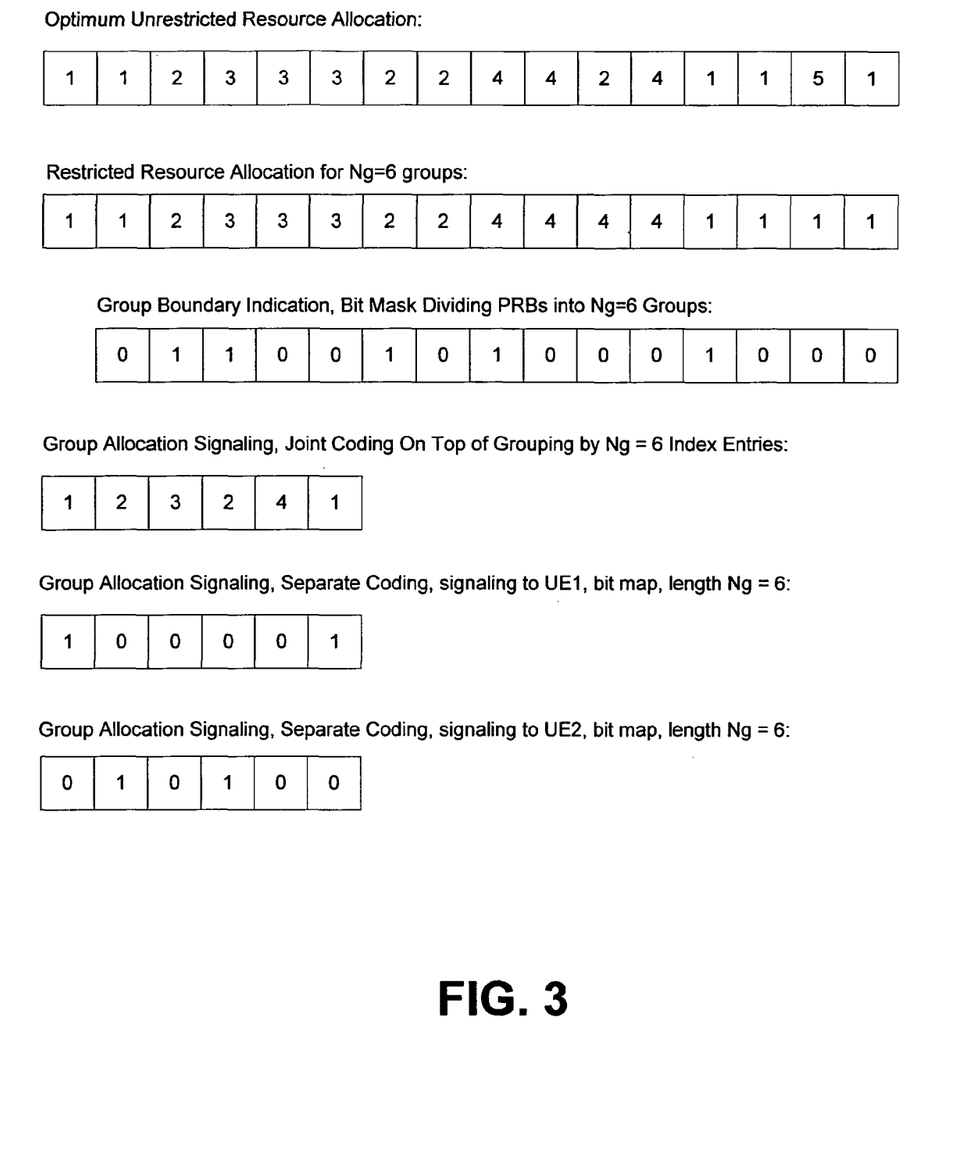
FIG. 3 shows the example of FIG. 2, but constrained to a maximum number of six groups.

In FIG. 3, the hypothetical scheduling example of FIG. 2 is revisited in the case where $N_g$ would be less than what is needed for unrestricted scheduling. The scheduler restricts its decision so that there are only $N_g=6$ groups. The corresponding signaling alternatives are portrayed in FIG. 3.

Figure 3A:
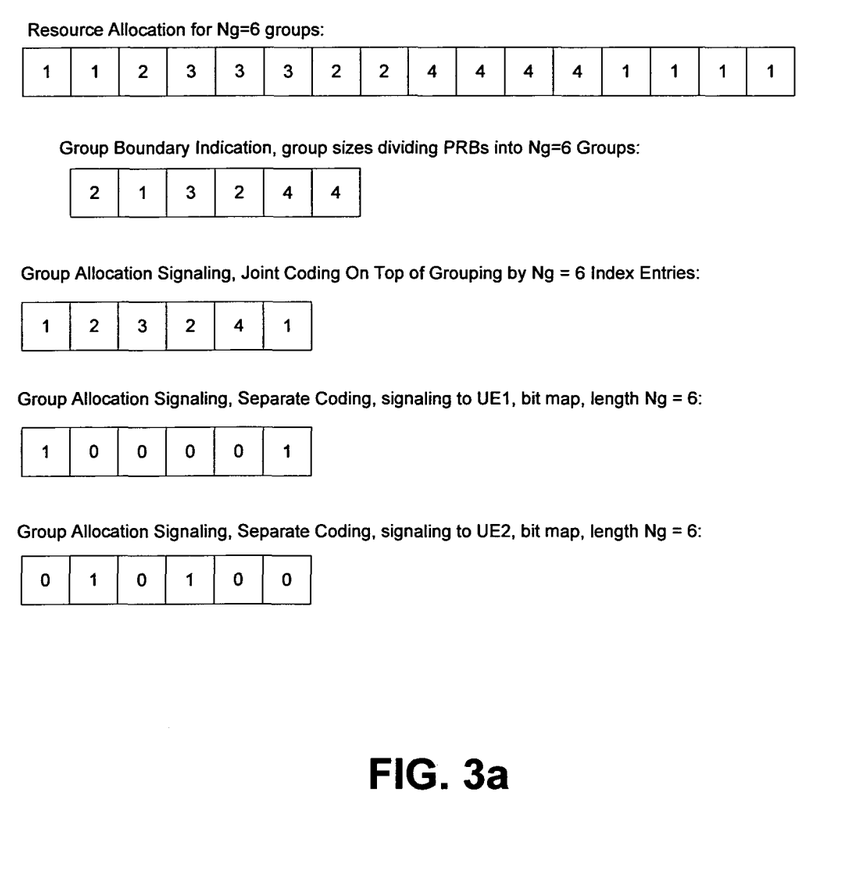
FIG. 3*a* shows an example of allocation, where the size of each group is signalled.

An alternative way of signalling the grouping is shown in FIG. 3a. Here, the size of each group is signalled. Using the same example as in FIG. 3, the group sizes are 2, 1, 3, 2, 4, 4. Since the groups are all of size 1-4, two bits are needed to indicate the group size (00 for the size of 1, 01 for the size of 2, 10 for the size of 3 and 11 for the size of 4). Furthermore, the size of the last group (shown with dashed box) need not be signalled since it can be calculated by subtracting the sum of the other sizes from the total size. Using two bits for each group size (max group size 4), the grouping into 6 groups can be signalled with 10 bits in this example $(N_g-1)*2$.

For larger number of resource blocks ($N_{PRB}$=25, 50, 100), more bits (say, 3-4) are needed to indicate the size of each group. For instance, by using $N_g$=10 groups and 3 bits per group size (max group size 8) for $N_{PRB}$=50, the grouping can be signalled with ($N_g$-1)*3=27 bits instead of 49 bits bit map. By using 4 bits per group size (max group size of 16) requires 36 bits for signalling of the grouping. The same 36 bits required with $N_{PRB}$=100 by using 4 bits per group size and a maximum of $N_g$=10 groups which is clearly less than the bit map of 99 bits. The size of the last group can be bigger since the size is not signalled but calculated.

For the signalling of the allocation there are several alternatives: 1) both Group boundary indication and Group allocation are signalled using separate coding, i.e., sent separately for each user; 2) Group boundary indication is signalled jointly for all users and Group allocation separately for each user; 3) both are signalled jointly. Alternative 2) is the currently the preferred one since separate coding has been selected as the working assumption and this alternative minimises the amount of allocation signalling. Thus, in the example of FIG. 3a, the 10 bits of group boundary indication would be signalled jointly to all users receiving allocation, whereas the group allocation signalling (6 bits bit map) is sent separately for each user.

Figure 4:
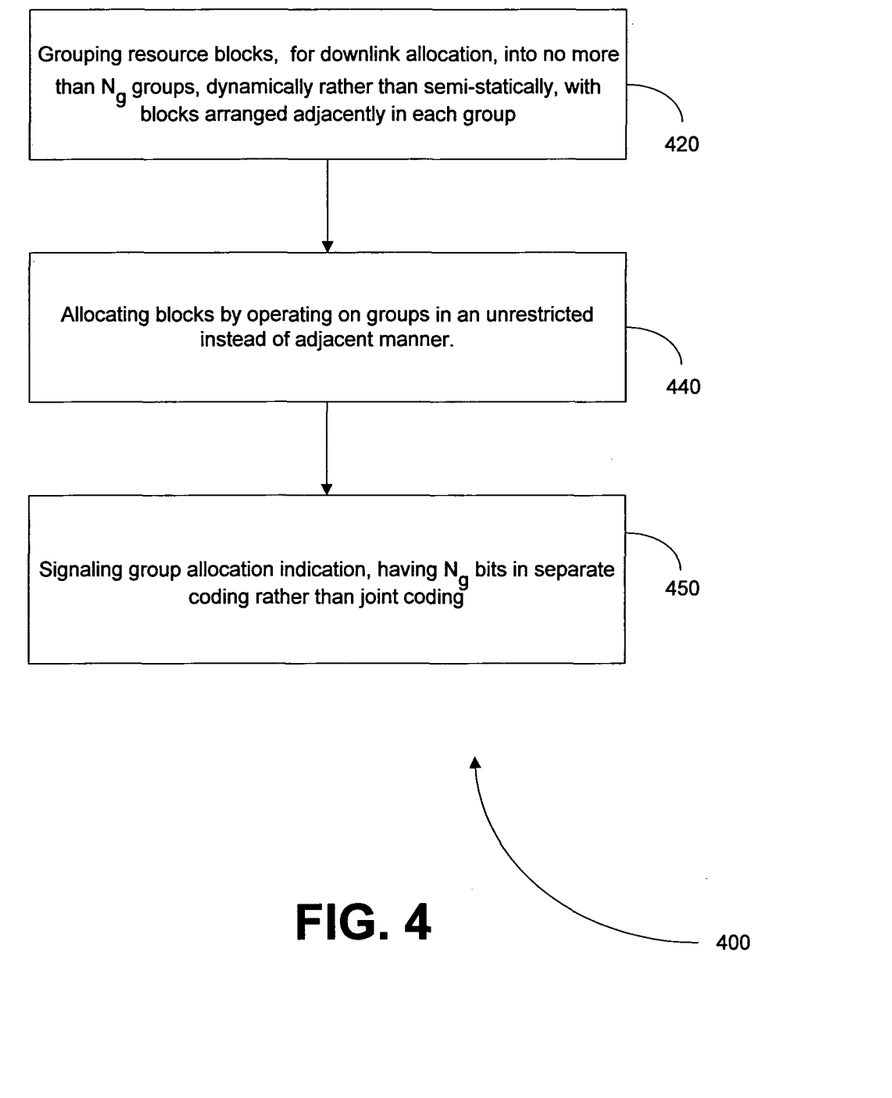
FIG. 4 is a flow chart showing a method according to an embodiment of the present invention.

The flow chart of FIG. 4 may assist a proper understanding of a method 400 according to an embodiment of the invention. Resource blocks for downlink allocation are grouped 420 into no more than a maximum number of groups, and this is done dynamically rather than semi-statically, with blocks arranged adjacently in each group. The grouping of the resource blocks may be defined by a network element based on knowledge of channel properties, queue status, Quality of Service requirements of different users, and any other information available to the network element, using any scheduling method known in the art. Then the blocks are allocated 440 by operating on the groups (rather than the blocks) in an unrestricted (instead of adjacent) manner. A group allocation indication is signalled 450, the indication having the maximum number of bits (equal to the maximum number of groups previously mentioned), for example in separate coding rather than joint coding.

Figure 5:
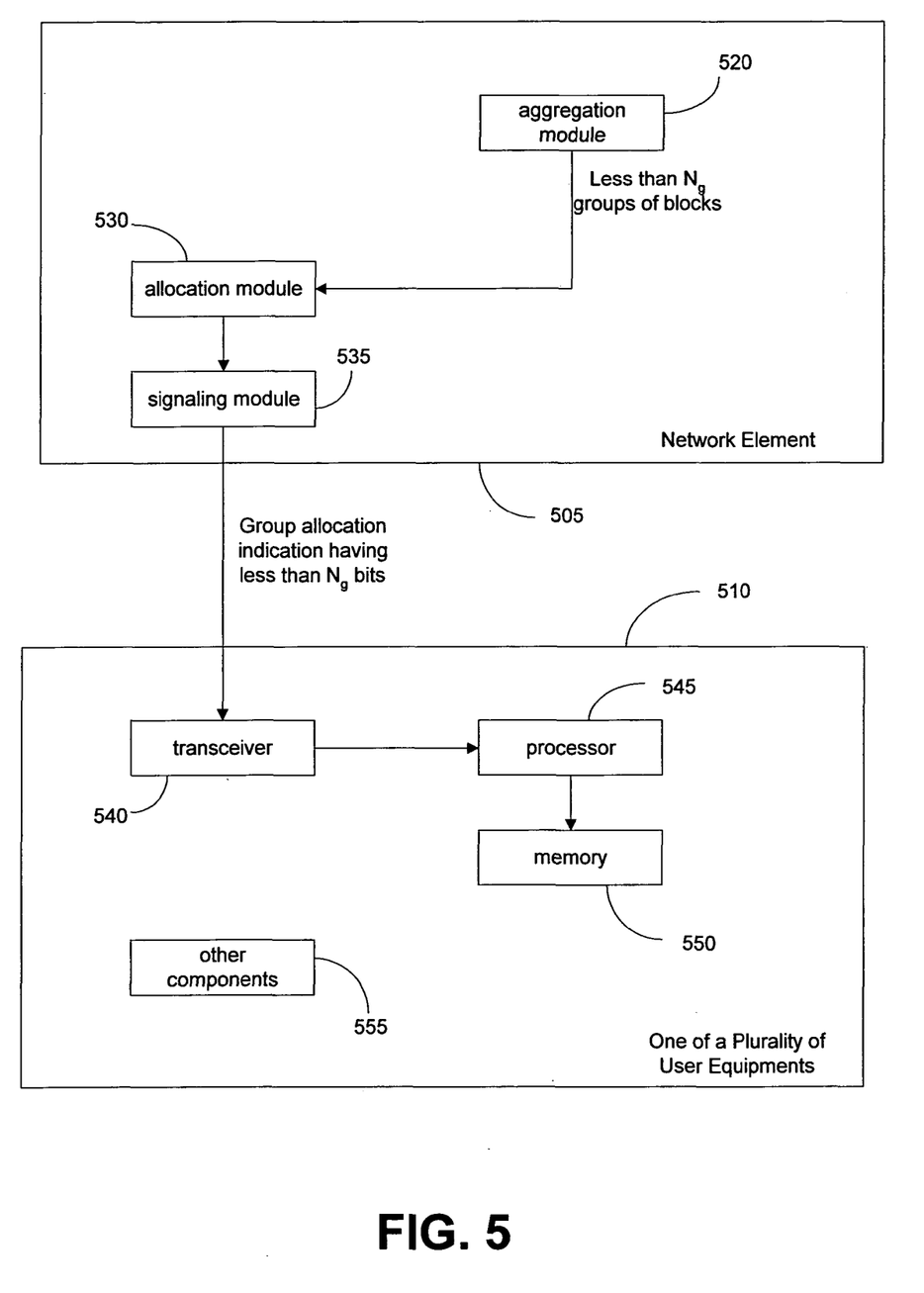
FIG. 5 is a block diagram showing a network element and user equipment according to an embodiment of the present invention.

Turning to FIG. 5, a network element 505 is shown, as is a user equipment 510 that is one of a plurality of user equipments. An aggregation module 520 puts a plurality of resource blocks into a number of groups, the number of groups being less than or equal to a maximum. The blocks in each group are consecutively arranged. Then the groups of resource blocks are allocated to various user equipments by an allocation module 530, and the user equipments are contacted via a signaling module 535.

The user equipment 510 includes a transceiver 540 which receives the resource allocation indication, and passes it along to a processor 545. The processor determines the allocation from the indication, and stores the resource allocation indication in memory 550. Of course, the user equipment also includes numerous other components 555 for a variety of purposes.

Several concepts included in the present invention will now be briefly described, without in any way limiting what may ultimately be claimed in this application.

The invention includes a first concept which is a method comprising: grouping resource blocks into a number of groups of the blocks, said number of groups being no greater than a maximum number, and said blocks arranged adjacently in each of said groups; allocating the resource blocks by operating on the groups; and signaling the allocation using a group allocation indication.

The invention includes a second concept which is the first concept, wherein the allocation is accomplished by transmitting a number of bits substantially equal to the maximum number of groups to the user equipment in separate coding instead of joint coding.

The invention includes a third concept which is the first concept, wherein the groups are allocated in an unrestricted instead of adjacent manner.

The invention includes a fourth concept which is the first concept, wherein the operating on the groups operates on the maximum number of the groups.

The invention includes a fifth concept which is the first concept, wherein the grouping is performed dynamically instead of semi-statically.

The invention includes a sixth concept which is the first concept, wherein the allocation is a downlink allocation that includes separate entries for downlink and uplink resource assignments.

The invention includes a seventh concept which is a network element comprising: means for grouping resource blocks into a number of groups of the blocks, said number of groups being no greater than a maximum number, and said blocks arranged adjacently in each of said groups; means for allocating the resource blocks by operating on the groups; and means for signaling the allocation using a group allocation indication.

The invention includes an eighth concept which is the seventh concept, wherein the means for signaling the allocation signals a number of bits substantially equal to the maximum number of groups to the user equipment in separate coding instead of joint coding.

The invention includes a ninth concept which is the seventh concept, wherein the means for allocating the resource blocks allocates the groups in an unrestricted instead of adjacent manner.

The invention includes a tenth concept which is the seventh concept, wherein the means for allocating the resource blocks operates on the maximum number of the groups.

The invention includes an eleventh concept which is the seventh concept, wherein the means for grouping functions dynamically instead of semi-statically.

The invention includes a twelfth concept which is the seventh concept, wherein the means for allocating yields a downlink allocation that includes separate entries for downlink and uplink resource assignments.

The invention includes a thirteenth concept which is a software product, the software product comprising a computer readable medium having executable codes embedded therein; the codes, when executed, adapted to carry out the functions of: grouping resource blocks into a number of groups of the blocks, said number of groups being no greater than a maximum number, and said blocks arranged adjacently in each of said groups; allocating the resource blocks by operating on the groups; and signaling the allocation using a group allocation indication.

The invention includes a fourteenth concept which is the thirteenth concept, wherein the allocation is accomplished by transmitting a number of bits substantially equal to the maximum number of groups to the user equipment in separate coding instead of joint coding.

The invention includes a fifteenth concept which is the thirteenth concept, wherein the groups are allocated in an unrestricted instead of adjacent manner.

The invention includes a sixteenth concept which is a network element comprising: an aggregation module configured to group resource blocks into a number of groups of the blocks, said number of groups being no greater than a maximum number, and said blocks arranged adjacently in each of said groups; an allocation module configured to allocate the resource blocks by operating on the groups; and a signaling module configured to signal the allocation using a group allocation indication The invention includes a seventeenth concept which is the sixteenth concept, wherein the signaling module is further configured to signal a number of bits equal to the maximum number of groups to the user equipment in separate coding instead of joint coding.

The invention includes an eighteenth concept which is the sixteenth concept, wherein the allocation module is configured to allocate the groups in an unrestricted instead of adjacent manner.

The invention includes a nineteenth concept which is a user equipment comprising: a transceiver configured to receive an allocation of a number of resource blocks over a downlink; and a processor configured to determine the allocation from a group allocation indication; wherein the allocation indication discloses resource blocks arranged in an adjacent manner within each of a plurality of groups, said number of groups being no greater than a maximum number.

The invention includes a twentieth concept which is the nineteenth concept, wherein the group allocation indication includes a number of bits substantially equal to the maximum number of groups, in separate coding instead of joint coding.

The invention includes a twenty-first concept which is the nineteenth concept, wherein the allocation of the groups is unrestricted instead of adjacent.

The embodiments described above can be implemented using a general purpose or specific-use computer system, with standard operating system software conforming to the method described herein. The software is designed to drive the operation of the particular hardware of the system, and will be compatible with other system components and I/O controllers. The computer system of this embodiment includes a CPU processor 545, comprising a single processing unit, multiple processing units capable of parallel operation, or the CPU can be distributed across one or more processing units in one or more locations, e.g., on a client and server. A memory 550 may comprise any known type of data storage and/or transmission media, including magnetic media, optical media, random access memory (RAM), read-only memory (ROM), a data cache, a data object, etc. Moreover, similar to the CPU, the memory may reside at a single physical location, comprising one or more types of data storage, or be distributed across a plurality of physical systems in various forms. Of course, a similar computer system can be implemented at the network side.

It is to be understood that the present figures, and the accompanying narrative discussions of best mode embodiments, do not purport to be completely rigorous treatments of the method, system, mobile device, network element, and software product under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various different combinations of hardware and software which need not be further detailed herein.

What is claimed is:

1. A method comprising:
    grouping resource blocks into a number of groups of the blocks, said number of groups being no greater than a maximum number, and said blocks arranged adjacently in each of said groups;
    allocating the resource blocks by operating on the groups; and
    signaling the allocation using a group allocation indication.

2. The method of claim 1, wherein said group allocation indication has a number of bits equal to said maximum number of groups.

3. The method of claim 1, wherein said maximum number of groups depends at least upon a system bandwidth.

4. The method of claim 3, wherein a size of at least one of said groups depends at least upon said maximum number of groups.

5. The method of claim 1, wherein a size of at least one of said groups depends at least upon a system bandwidth.

6. The method of claim 1, wherein the allocation is accomplished by transmitting a number of bits substantially equal to the maximum number of groups to a user equipment in separate coding instead of joint coding.

7. The method of claim 1, wherein the groups are allocated in an unrestricted instead of adjacent manner.

8. The method of claim 1, wherein the operating on the groups operates on the maximum number of the groups.

9. The method of claim 1, wherein the grouping is performed dynamically instead of semi-statically.

10. The method of claim 1, wherein the allocation is a downlink allocation that includes separate entries for downlink and uplink resource assignments.

11. A non-transitory computer readable storage medium having computer readable software code therewith directly loadable into the internal memory of a digital computer configured to cause the digital computer upon execution of the code portions to perform at least:
    grouping resource blocks into a number of groups of the blocks, said number of groups being no greater than a maximum number, and said blocks arranged adjacently in each of said groups;
    allocate the resource blocks by operating on the groups; and
    signal the allocation using a group allocation indication.

12. The computer readable memory of claim 11, wherein said group allocation indication has a number of bits equal to said maximum number of groups.

13. The computer readable memory of claim 11, wherein said maximum number of groups depends at least upon a system bandwidth.

14. The computer readable memory of claim 13, wherein a size of at least one of said groups depends at least upon said maximum number of groups.

15. The computer readable memory of claim 11, wherein the allocation is accomplished by transmitting a number of bits substantially equal to the maximum number of groups to a user equipment in separate coding instead of joint coding.

16. The computer readable memory of claim 11, wherein the groups are allocated in an unrestricted instead of adjacent manner.

17. An apparatus comprising:
    at least one processor;
    memory storing computer program code;
    wherein the memory storing the computer program code is configured to, with the at least one processor, cause the apparatus to:

group resource blocks into a number of groups of the blocks, said number of groups being no greater than a maximum number, and said blocks arranged adjacently in each of said groups;

allocate the resource blocks by operating on the groups; and signal the allocation using a group allocation indication.

18. The apparatus of claim 17, wherein said group allocation indication has a number of bits equal to said maximum number of groups.

19. The apparatus of claim 17, wherein said maximum number of groups depends at least upon a system bandwidth.

20. The apparatus of claim 19, wherein a size of at least one of said groups depends at least upon said maximum number of groups.

21. The apparatus of claim 17, wherein the memory storing the computer program code is further configured to, with the at least one processor, cause the apparatus to signal a number of bits equal to the maximum number of groups to a user equipment in separate coding instead of joint coding.

22. The apparatus of claim 17, wherein the memory storing the computer program code is further configured to, with the at least one processor, cause the apparatus to allocate the groups in an unrestricted instead of adjacent manner.

23. The apparatus of claim 17, wherein said apparatus is a network element.

24. An apparatus comprising:

at least one processor;

memory storing a program of instructions;

wherein the memory storing the program of instructions is configured to, with the at least one processor, cause the apparatus to at least:

configure a receiver to receive an allocation of a number of resource blocks over a downlink; and determine the allocation from a group allocation indication; wherein the allocation indication discloses resource blocks arranged in an adjacent manner within each of a plurality of groups, said number of groups being no greater than a maximum number.

25. The apparatus of claim 24, wherein said group allocation indication has a number of bits equal to said maximum number of groups.

26. The apparatus of claim 24, wherein said maximum number of groups depends at least upon a system bandwidth.

27. The apparatus of claim 26, wherein a size of at least one of said groups depends at least upon said maximum number of groups.

28. The apparatus of claim 24, wherein the group allocation indication includes a number of bits substantially equal to the maximum number of groups, in separate coding instead of joint coding.

29. The apparatus of claim 24, wherein the allocation of the groups is unrestricted instead of adjacent.

30. The apparatus of claim 24, wherein said apparatus is a user equipment.

31. A method comprising:

configuring a receiver to receive an allocation of a number of resource blocks over a downlink; and determining the allocation from a group allocation indication;

wherein the allocation indication discloses resource blocks arranged in an adjacent manner within each of a plurality of groups, said number of groups being no greater than a maximum number.

32. The method of claim 31, wherein said group allocation indication has a number of bits equal to said maximum number of groups.

33. The method of claim 31, wherein said maximum number of groups depends at least upon a system bandwidth.

34. The method of claim 33, wherein a size of at least one of said groups depends at least upon said maximum number of groups.

35. The method of claim 31, wherein the group allocation indication includes a number of bits substantially equal to the maximum number of groups, in separate coding instead of joint coding.

36. The method of claim 31, wherein the allocation of the groups is unrestricted instead of adjacent.

37. The method of claim 31, wherein configuring the receiver and determining the allocation are performed in operation of a user equipment.

* * * * *